United States Patent [19]

Hasegawa et al.

[11] Patent Number: 5,557,327
[45] Date of Patent: Sep. 17, 1996

[54] IMAGE INPUT APPARATUS WITH TWO-DIMENSIONAL PIXEL SHIFT

[75] Inventors: Hiroshi Hasegawa; Takashi Minaki; Yukinori Koizumi, all of Tokyo, Japan

[73] Assignee: Konica Corporation, Tokyo, Japan

[21] Appl. No.: 391,165

[22] Filed: Feb. 21, 1995

[30] Foreign Application Priority Data

Feb. 23, 1994 [JP] Japan .................................. 6-025024

[51] Int. Cl.⁶ .................................................. H04N 5/225
[52] U.S. Cl. ........................... 348/340; 348/219; 348/239
[58] Field of Search .................................... 348/207, 219, 348/340, 343, 344, 335, 374, 375, 239; H04N 5/225

[56] References Cited

U.S. PATENT DOCUMENTS 5,363,136   11/1994   Sztanko et al. .......................... 348/207
5,400,070   3/1995    Johnson et al. .......................... 348/219

FOREIGN PATENT DOCUMENTS 61-75679   4/1986   Japan ............................... H04N 9/07
3-231589   10/1991  Japan ............................... H04N 5/335

Primary Examiner—Michael T. Razavi
Assistant Examiner—Tuan V. Ho
Attorney, Agent, or Firm—Finnegan, Henderson, Farabow, Garrett & Dunner, L.L.P.

[57] ABSTRACT

An image input apparatus includes a picture-taking optical system, a facial imaging device, a transparent parallel flat plate member arranged in an optical path of the optical system approximately in parallel with a picture-taking surface of the imaging device, a tilting member to tilt the transparent member with respect to the imaging device so that the image formed on the imaging device is moved, a memory to store each image moved when the transparent member is tilted, and an image synthesizer to synthesize an image of high resolution from the image stored in the memory. Three points not aligned on a straight line are selected from the transparent member, and one point is used as a support point and other two points are used as operation points so that the tilting member is operated through these support and operation points.

9 Claims, 11 Drawing Sheets

IMAGE INPUT APPARATUS WITH TWO-DIMENSIONAL PIXEL SHIFT

BACKGROUND OF THE INVENTION

The present invention relates to an image input apparatus of high resolution having a transparent member disposed between a solid state imaging device and a picture-taking optical system, wherein the transparent member is capable of being angularly displaced. More particularly, the present invention relates to an image input apparatus in which a tilting device for angularly displacing the transparent member is improved.

Concerning the image input apparatus in which the two-dimensional type imaging device is used, the following method is publicly known:
A relative position between the image and the imaging device is minutely changed. Each time the relative position is changed, the image is inputted. Therefore, the number of pixels is increased in appearance, so that the resolution of the image can be enhanced.
In order to enhance the resolution by the above method, the following techniques are disclosed:
According to Japanese Patent Publication Open to Public Inspection No. 75679/1986, a flat plate of glass is arranged in front of the imaging cell. This flat glass plate is tilted by the vibration generated when a vibration member is driven. In this way, a relative movement is caused between the imaging cell and the image. Further, according to Japanese Patent Publication Open to Public Inspection No. 231589/1991, a parallel flat glass plate is arranged between the imaging device and the photographic lens. The parallel flat glass plate is rotated around the rotational axes of X and Y by a drive mechanism, so that the flat glass plate is minutely tilted and the image passing through the parallel flat glass plate is moved in the directions of X and Y axes with respect to the imaging device.

However, the invention disclosed in Japanese Patent Publication Open to Public Inspection No. 75679/1986 is disadvantageous in the following manner:
A flat plate member (glass) is tilted by a vibration member arranged at one position. Accordingly, in order to shift the pixels two-dimensionally in the direction of X-axis (horizontally) and the direction of Y-axis (vertically), two flat plate members are required, that is, two glass plates are required, one is tilted in the X-axis direction, and the other is tilted in the Y-axis direction. However, when the two glass plates are used, an amount of light is reduced when light passes through the two glass plates, and further the wavefront-aberration is increased and the dimensions of the entire apparatus are extended.

Also, the invention disclosed in Japanese Patent Publication Open to Public Inspection No. 231589/1991 is disadvantageous in the following manner:
According to the invention, one flat glass plate is tilted around both axes of X and Y. In this case, a rotating device for rotating the flat glass plate around the X-axis must be moved when the flat glass plate is rotated around the Y-axis. Therefore, the rotating device for rotating the flat glass plate requires a high drive force, so that the dimensions of the apparatus are extended and the cost is raised.

SUMMARY OF THE INVENTION

It is an object of the present invention to provide an image input apparatus in which pixels are two-dimensionally shifted in the direction of X-axis (horizontally) and the direction of Y-axis (vertically) by a simple means using one flat glass plate. The image input apparatus of the present invention comprises: a picture-taking optical system; a facial imaging device; a transparent parallel flat plate member arranged in an optical path of the picture-taking optical system approximately in parallel with a picture-taking surface of the imaging device; a tilting means for tilting the transparent member with respect to the imaging device so that the image formed on the imaging device is moved; a memory means for storing each image moved when the transparent member is tilted; and an image synthesizing means for synthesizing an image of high resolution from the image stored in the memory means, wherein three points not aligned on a straight line are selected from the transparent member, and one point is used as a support point and other two points are used as operation points so that the tilting means is operated through these support and operation points.

When one of the operation points is operated, the transparent member is tilted around a rotational axis coinciding with a straight line connecting the other operation point with the support point. Accordingly, an image which has been transmitted through the transparent member is moved by the tilting motion of the transparent member, and this moved image is formed on the imaging device. In this way, a slightly shifted image can be stored in the memory. When the same operating point is further operated, the image is successively moved in the same direction, and the shifted image is successively formed on the imaging device and stored in the memory. When the operation point to be operated is changed, the transparent member is tilted around a rotational axis coinciding with a straight line connecting the operation point with the support point. Therefore, the image is moved in a direction different from that described above. When the movements in the two directions are appropriately combined, it is possible to shift the image two-dimensionally to an arbitrary position.

BRIEF DESCRIPTION OF THE DRAWINGS

FIG. 13(b) is a schematic illustration showing the mechanism of linear movement of another example of the present invention.

DETAILED DESCRIPTION OF THE PREFERRED EMBODIMENT

With reference to the accompanying drawings, an example of the image input apparatus of the present invention will be explained below.

Figure 1:
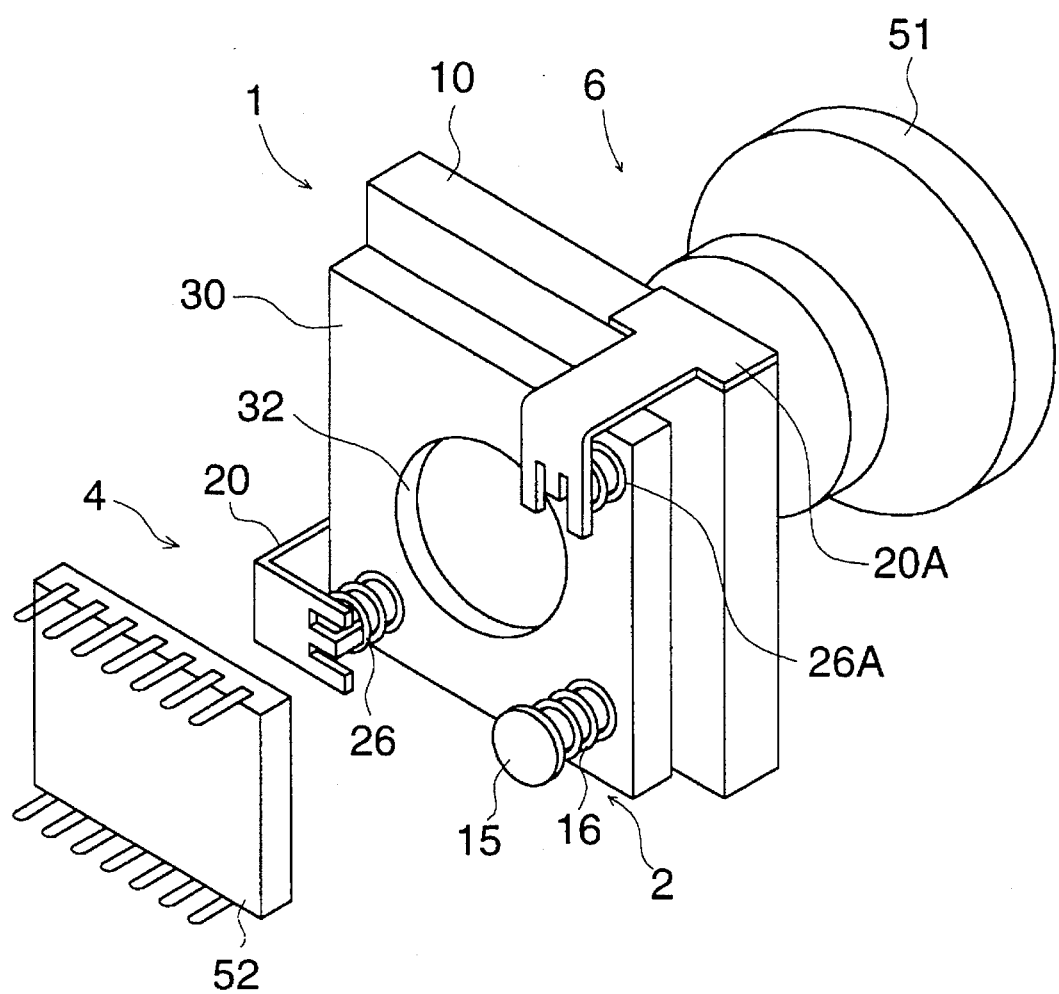
FIG. 1 is a perspective view showing the image input apparatus of the present invention.

As illustrated in FIG. 1, a picture-taking lens 51 is attached to a frame (not shown) through an attachment member not shown. At the rear of the picture-taking lens 51, an imaging device 52 (CCD) is arranged on the optical axis of the picture-taking lens. The imaging device 52 (CCD) is integrally fixed to the frame. The imaging device 52 is composed in such a manner that photoelectric transfer elements are two-dimensionally arranged on a photoelectric transfer surface and connected with an image processing apparatus described later.

Figure 2:
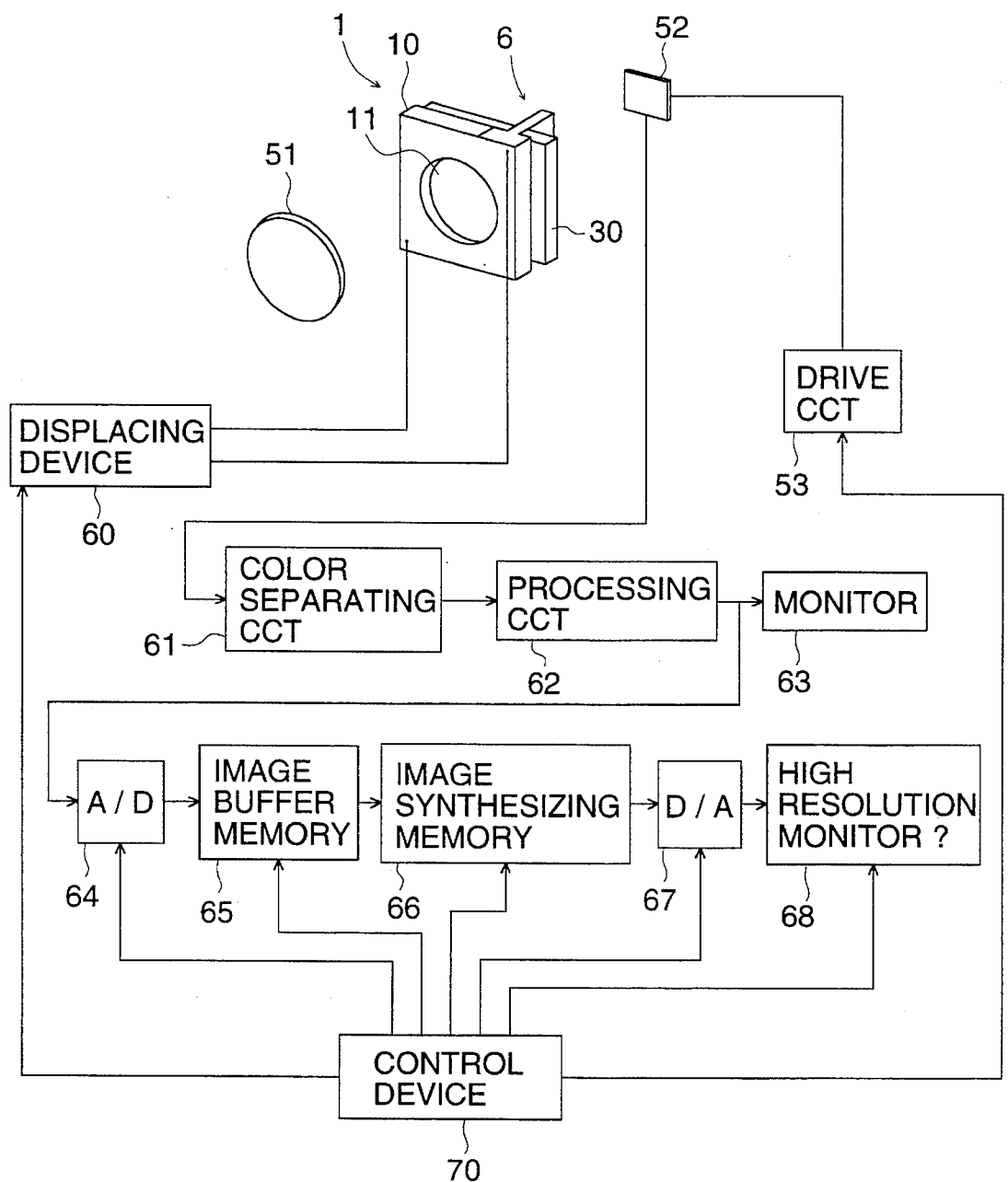
FIG. 2 is a block diagram for explaining the circuit of the image input apparatus of the present invention.

The overall arrangement of the image processing apparatus is shown in FIG. 2. The imaging device 52 is driven by a drive circuit 53 that controls the accumulation and reading of electrical charge, so that a time-division multiplex color image is outputted from imaging device 52. This outputted color image is subjected to sample-holding in a color separating circuit 61 and converted into a simultaneous 3-primary-color signal. Then the signal is subjected to various corrections in a process circuit 62. After that, the signal is inputted into a monitor 63, so that a color image is displayed on the image plane. The 3-primary-color image signal is also inputted into an A/D converter 64 and converted into a digital signal. Then the signal is stored in an image buffer memory 65. Image data stored in this image buffer memory 65 is transmitted to an image synthesizing memory 66 provided in the following stage before the image plane is rewritten by the next image data. The capacity of this image synthesizing memory 66 is high so that the image synthesizing memory 66 is capable of storing image data of 3 colors, the number of pixels of which is 3 times as large as that of the imaging device 52 with respect to the vertical and horizontal directions. The image stored in this image synthesizing memory 66 is scanned and converted by a D/A converter 67. Then the image is displayed on a high resolution monitor 68. In this way, the image of high resolution is provided.

A glass tilting means 1 is arranged between the picture-taking lens 51 and the imaging device 52. In this case, the glass tilting means 1 is arranged substantially perpendicularly to the optical axis. The glass tilting means 1 is illustrated in FIG. 1. As illustrated in FIG. 1, the glass tilting means 1 includes a base unit 10 and a glass unit 30 arranged on the side of the imaging device 52 with respect to the base unit 10. The base unit 10 is attached to the frame described before. An opening is formed at the center of the base unit 10, and an opening is also formed at the center of the glass unit 30. An image sent from the picture-taking lens 51 passes through the opening 11 (FIG. 2) formed in the base unit 10 and then passes through a flat parallel glass plate 32 attached at the center of the glass unit 30. In this way, the image sent from the picture-taking lens 51 reaches the imaging device 52.

At three corners of the base unit 10, there are provided a support portion 2, a first operating portion 4 and a second operating portion 6. The glass unit 30 is tiltably attached to the base unit 10 through these support portion 2, first operating portion 4 and second operating portion 6.

Figure 4:
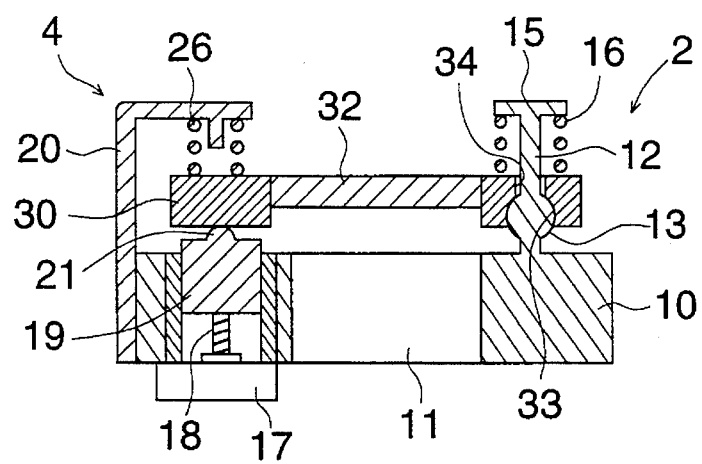
FIG. 4 is a sectional view taken on line A—A in FIG. 3.

Next, with reference to FIG. 4, the structure of each portion will be described as follows. As illustrated in FIG. 4, the support portion 2 includes: a support member 12 attached to the base unit 10; a dent 33 formed on the glass unit 30; and a spring 16. The configuration of the dent 33 is approximately the same as that of a spherical protrusion 13 formed on the support member 12. Therefore, the dent 33 is slidably engaged with the spherical protrusion 13. This support member 12 penetrates an opening 34 formed in the glass unit 30, and a spring 16 is interposed between a presser portion 15 formed at the top of the support member 12 and the glass unit 30. This spring 16 is a compression spring, and the glass unit 30 is always pushed toward the base unit 10 by the action of the spring 16. In this connection, the configuration of the dent 33 is not limited to a sphere, but it may be a trigonal pyramid.

The first operating portion 4 includes: a motor 17 attached to the base unit 10; a threaded drive shaft 18 of the motor 17; a drive member 19 screwed to the drive shaft 18; a spring 26; and a spring presser plate 20. The motor 17 is connected with a displacing device 60 (FIG. 2). When the motor 17 is driven by a signal from displacing device 60 (FIG. 2), the drive shaft 18 is rotated, and the drive member 19 is advanced or withdrawn. A spherical protrusion 21 is formed on the upper surface of the drive member 19. This spherical protrusion 21 comes into contact with the glass unit 30. The spring presser plate 20 is bent into an L-shape, one end of which is fixed to the base unit 10, and the other end of which is engaged with the spring 26. The spring 26 is a compression spring. By the action of the spring 26, the glass unit 30 is pushed toward the base unit 10 side. The second operating portion 6 is arranged in such a manner that a straight line connecting the second operating portion 6 with the support portion 2 meets at right angles with a straight line connecting the first operating portion 4 with the support portion 2. The structure of the second operating portion 6 is the same as that of the first operating portion 4. Therefore, the explanation will be omitted here.

Figure 3:
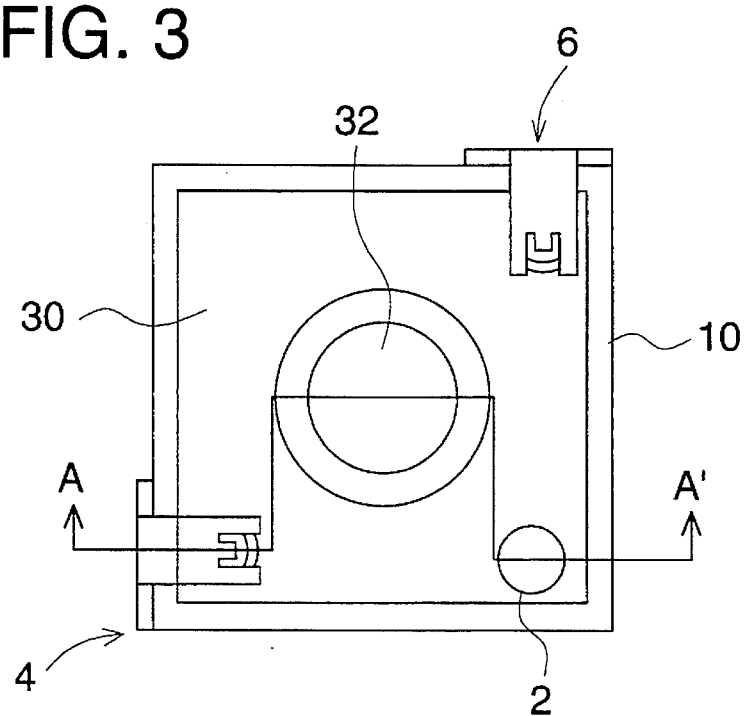
FIG. 3 is a front view of the tilting means.

Next, operation of the glass tilting means 1 will be explained below. In order to make the explanation clearer, the reference numeral of each part of the second operating portion 6 is composed in such a manner that character "A" is attached to the reference numeral of the same part of the first operating portion 4. In this way, the parts of the second operating portion 6 are discriminated from those of the first operating portion 4. In this case, the axes of X and Y are established in the following manner:

The Y-axis is established in the vertical direction in FIG. 1 or FIG. 3 and the X-axis is established in the horizontal direction on a surface parallel with the surface of FIG. 3 which is a view showing the tilting means 1.

The glass tilting means 1 is parallel with the imaging device 52 in the initial condition, however, the glass unit 30 is not necessarily arranged to be parallel with the imaging device 52 in the initial condition. First, by the operation of the drive circuit 53, an image is taken in by the imaging device 52 before the tilting means 1 is operated. The image that has been taken in is processed in the color separating circuit 61 and the process circuit 62. Then the image is displayed on the monitor 63. At the same time, data of the image is subjected to A/D conversion by the A/D 64 and stored in the image buffer memory 65. This image is referred to as image α in this specification, hereinafter.

First, an image signal of image α is stored in the buffer memory 65. Then the motor 17 of the first operating portion 4 is operated by a signal sent from the displacing device 60. Due to the foregoing, the glass unit 10 is tilted, resisting a force of the spring 26. This tilting motion is carried out around a first rotational axis coinciding with a straight line connecting the protrusion 13 of the support portion 2 with the protrusion 21A of the second operating portion 6, thus parallel to the Y axis. Accordingly, the glass unit 30 is tilted around the the first rotation axis in a direction orthogonal to the X-axis. Due to the foregoing, the image that has passed through the picture-taking lens 51 is moved along the direction of the X-axis by the action of the tilted flat parallel glass plate 32. This image is referred to as image β in this specification, hereinafter. Then the moved image of β is taken in by the imaging device 52, and sent to the image buffer memory 65 in the same manner as that of the image of α. As described above, the glass unit 30 is successively tilted orthogonal to the X-axis direction by the glass tilting means 1, and the moved images, the number of which is the same as that of movements, are stored in the memory one after another.

After the glass unit 30 has been moved twice orthogonal to the direction of the X-axis, the motor 17A of the second operating portion 6 is driven. Then the glass unit 30 is moved orthogonal to the Y-axis direction around a second rotational axis coinciding with a straight line connecting the protrusion 21 of the first operating portion 4 with the support portion 2, thus parallel to the X axis. In this case, an amount of movement of the first operating portion 4 is very small. Therefore, the explanation will be made under the condition that the straight line connecting the first operating portion 4 with the support portion 2 is assumed to be parallel to the X-axis even after the movement. However, when the rotational shaft is moved, the substantial image can be moved accurately. When the glass unit 30 is moved around the X-axis orthogonal to the Y-axis direction as described above, the image is moved along the Y-direction. Under the above condition, the image is stored, and then the motor 17 of the first operating portion 4 is driven in the direction opposite to that described before, and the stored image located at a position moved along the Y-axis direction is successively moved along the X-axis and stored.

As described above, the image is moved to 3 positions in the X-axis direction, and also the image is moved to 3 positions in the Y-axis direction, so that the image is moved to 9 positions in total, and each moved image is stored in the buffer memory 65. When each moved image is synthesized by the image synthesizing memory 66, the resolution of the image is enhanced. The thus obtained image synthesized by the synthesizing memory 66 is subjected to D/A conversion by the D/A 67 and displayed on the high resolution monitor 68. Control of the above entire apparatus is carried out by the control unit 70.

Next, a relation between the tilt of the glass plate and the amount of image movement will be explained below.

When the tilt angle of the glass plate is θ1, the amount Δx of image movement is expressed by the following expression 1.

[Expression 1]

$$\Delta x = \frac{d}{\sqrt{1-(\sin\theta_1/n)^2}} \left\{ \sin\theta_1 \sqrt{1-(\sin\theta_1/n)^2} - \cos\theta_1 \frac{\sin\theta_1}{n} \right\}$$

In the above expression, "n" is the index of refraction of glass, and "d" is the thickness of the glass plate. The tilt angle θ1 of the glass plate is determined by the pitch of pixels of the imaging device 52 and also determined by the number of division of the pitch of pixels. For example, when the pitch of pixels is 10 μm and divided into 4, Δx is 2.5 μm, and when the thickness d of the glass plate is 2 mm and the index n of refraction is 1.5, the tilt angle θ is 0.22°. Further, when the distance l from the second operating portion 6 to the support portion 2 is, for example, 40 mm, the amount of displacement b of the first operating portion 4 is expressed as follows.

$$b = l \tan 0.22° = 0.15 \text{ mm}$$

When the color filter is an on-tip-filter, the image is moved by a distance corresponding to 3 pitches at the maximum. In this case, Δx is 30 μm, and the tilt angle θ is 2.6°, and when l is 40 mm, the displacement amount b is 1.82 mm.

Figure 10:
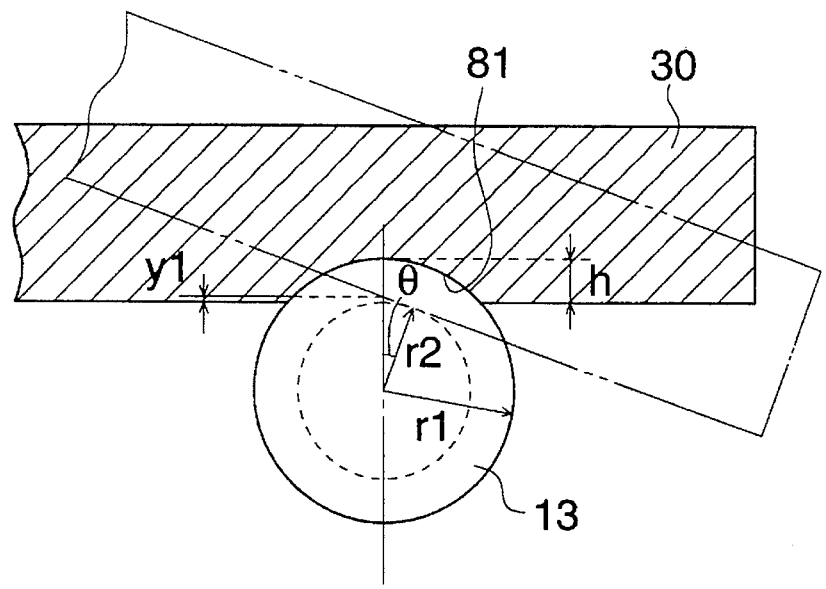
FIG. 10 is a sectional view of the support portion.

Next, with reference to FIGS. 10 and 11, errors caused in the support portion 2 and the operating portion 4 or 6 will be explained as follows. At the support portion 2, as illustrated in FIG. 10, a spherical dent 81, the depth of which is h, is formed on the glass unit 30. This dent 81 is accommodated in a spherical protrusion 13 formed on a support portion 2, the radius of which is r1. When the glass unit 30 is tilted as illustrated in FIG. 10, the error y1 expressed by the following expression 2 is generated in the vertical direction in the support portion 2.

[Expression 2]

$$\begin{aligned} y1 &= \{r2^2 + (r2 \cdot \tan\theta)^2\}^{1/2} - r2 \\ &= r2/\cos\theta - r2 \end{aligned} \quad (2)$$

In the above expression, r2=r1−h.

Figure 11:
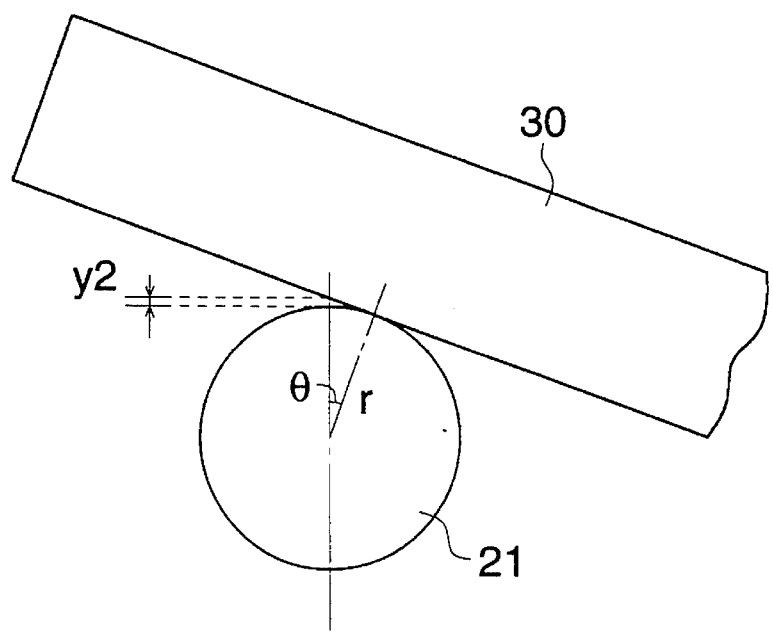
FIG. 11 is a sectional view of the operating portion.

As illustrated in FIG. 11, the first operating portion 4 is formed to be a sphere protrusion 21, the radius of which is r. The glass unit 30 is slidably put on the first operating portion 4. When the glass unit 30 is tilted by the angle θ, the error y2 expressed by the following expression 3 is generated between the amount of vertical movement of the first operating portion 4 and the amount of actual movement of the glass unit 30.

[Expression 3]

$$\begin{aligned} y2 &= \{r^2 + (r \cdot \tan\theta)^2\}^{1/2} - r \\ &= r/\cos\theta - r \end{aligned} \quad (3)$$

As described above, the errors y1 and y2 are respectively generated in the support portion 2 and the first operating portion 4. For this reason, the amount of movement at the first operating portion 4 is not accurately proportional to the tilt angle. Therefore, first, r=r1−h, and then a straight line connecting the radius center of the spherical protrusion 13 at the support portion 2 with the radius center of the spherical protrusion 21 at the first operating portion 4 is made to be parallel with the glass plate surface of the glass unit 30. Due to the foregoing, both errors are canceled, so that the problem of the errors can be solved. As another example, r is made to be equal to h, that is, r=h, and the radius center of the spherical protrusion 13 at the support portion 2 may be made to coincide with the lower surface of the glass unit 30. In this case, r1 can be made to be 0 at the support portion 2. Therefore, it is effective in the case where the error is reduced in such a manner that r2 of the spherical protrusion 21 at the first operating portion 4 is formed into a needle-shape by which a point-contact with the glass unit 30 can be provided.

Figure 6:
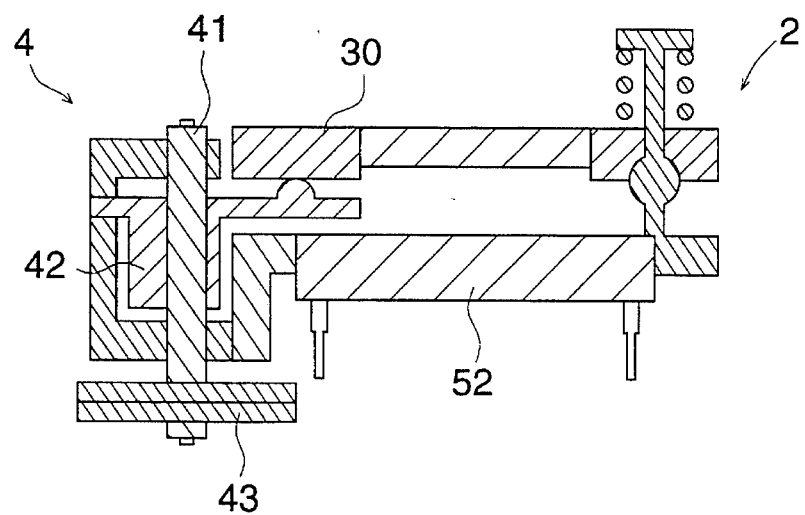
FIG. 6 is a sectional view showing still another example of the present invention.
Figure 7:
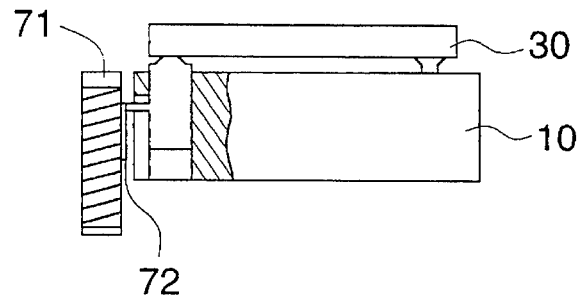
FIG. 7 is a sectional view showing still another example of the present invention.
Figure 8:
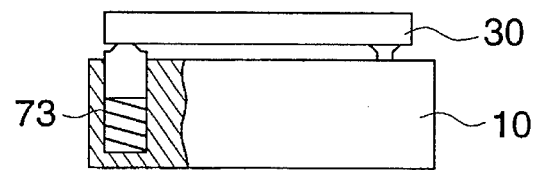
FIG. 8 is a sectional view showing still another example of the present invention.
Figure 9:
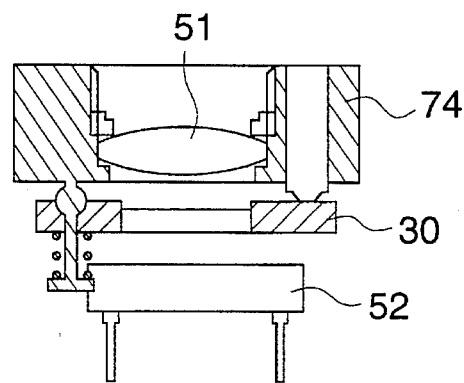
FIG. 9 is a sectional view showing still another example of the present invention.

In this example, the spring 16 is used for the pushing means for pushing the glass unit 30 to the side of the base unit 10 at the support portion 2 or the first operating portion 4. However, it should be noted that the present invention is not limited to the specific example, and the pushing means is not limited to the spring, but a resilient member such as a rubber member, leaf spring and magnet may be applied. Further, the drive means for driving the first operating portion 4 is not limited to the motor. The drive means for driving the first operating portion 4 may be composed in the following manner:

As shown in FIG. 6, the lifting member 42 is screwed into the screw portion 41. The screw portion 41 is rotated through the gear 43, so that the glass unit 30 is tilted. As shown in FIG. 7, the rotatable screw 71 and the engaging member 72 engaging with this screw 71 are provided, and the screw 71 is appropriately rotated by a motor (not shown), so that the engaging member 72 is advanced or withdrawn and the protruding portion such as the first operating portion 4 is moved. As illustrated in FIG. 8, the lamination type piezo-electric actuator 73 in which piezoelectric elements are laminated is provided, and a voltage is impressed upon the piezoelectric actuator 73. In this way, the protruding portion of the first operating section 4 is advanced or withdrawn, so that the glass unit 30 can be tilted. As another example is shown in FIG. 9, the base unit 10 may be formed into one body integrally with the lens barrel 74 for supporting the picture-taking lens 51.

Figure 5:
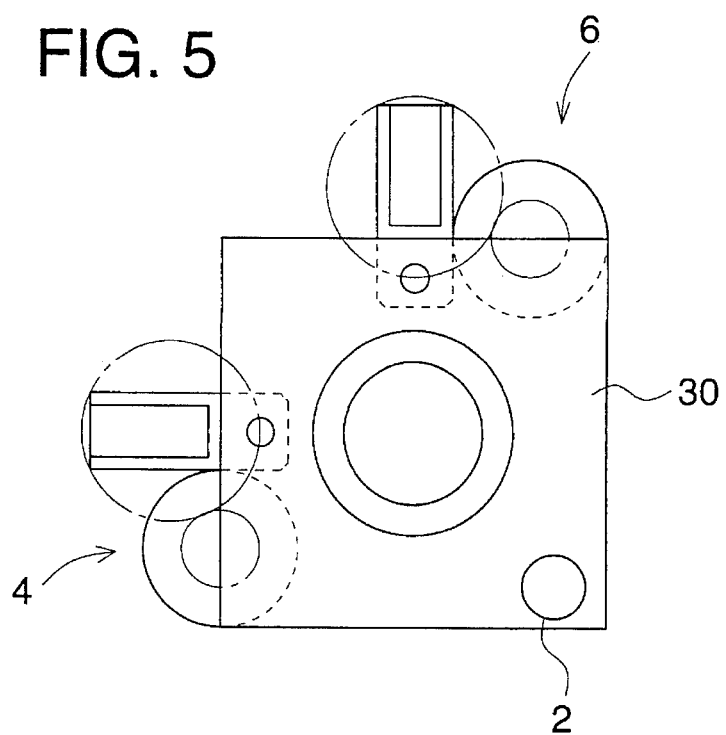
FIG. 5 is a front view showing another example of the present invention.

The number of times of tilting motions of the glass unit 30, that is, the number of times of image input operations conducted in one pitch can be arbitrarily selected, for example, the glass unit 30 may be laterally tilted twice and longitudinally tilted twice, that is, the glass unit 30 is tilted 4 times in total. Alternatively, the glass unit 30 may be laterally tilted three times and longitudinally tilted twice. In this way, the number of times of tilting operations is not limited. Further, the positional relation between the support portion 2 and the operating portions 4, 6 is not necessarily to be a square disposition. As illustrated in FIG. 5, the support portion 2 may be disposed at a corner of the glass unit 30, and each of the operating portions 4, 6 may be disposed at the center of a side distant from the support portion 2. In this case, two rotational axes, one is a rotational axis connecting the operating portion 4 with the support portion 2, the other is a rotational axis connecting the operating portion 6 with the support portion 2, are not at right angles to each other. In this case, even when the glass unit 30 is tilted in one of the directions of X and Y axes, it is necessary to move one operating portion, and it is also necessary to move the other operating portion by an amount of movement that is approximately ½ of the amount of movement of the former operating portion. However, the operating portions 4, 6 are respectively disposed at the center of the side of the glass unit 30. Therefore, the glass unit 30 is not given a twisting force, so that the operation can be smoothly carried out.

According to the image input apparatus of the present invention, a transparent glass plate is held by one support portion and two operating portions, and the two operating portions are appropriately operated. When one operating portion is operated, the glass plate is tilted with fulcrums of the support portion and the other operating portion. Accordingly, the glass plate disposed between the picture-taking lens and the imaging device can be positively and accurately tilted to an arbitrary angle using a simple structure.

The following is an example showing a linear movement mechanism to which the pixel shift mechanism of an electronic still camera is applied.

Figure 12:
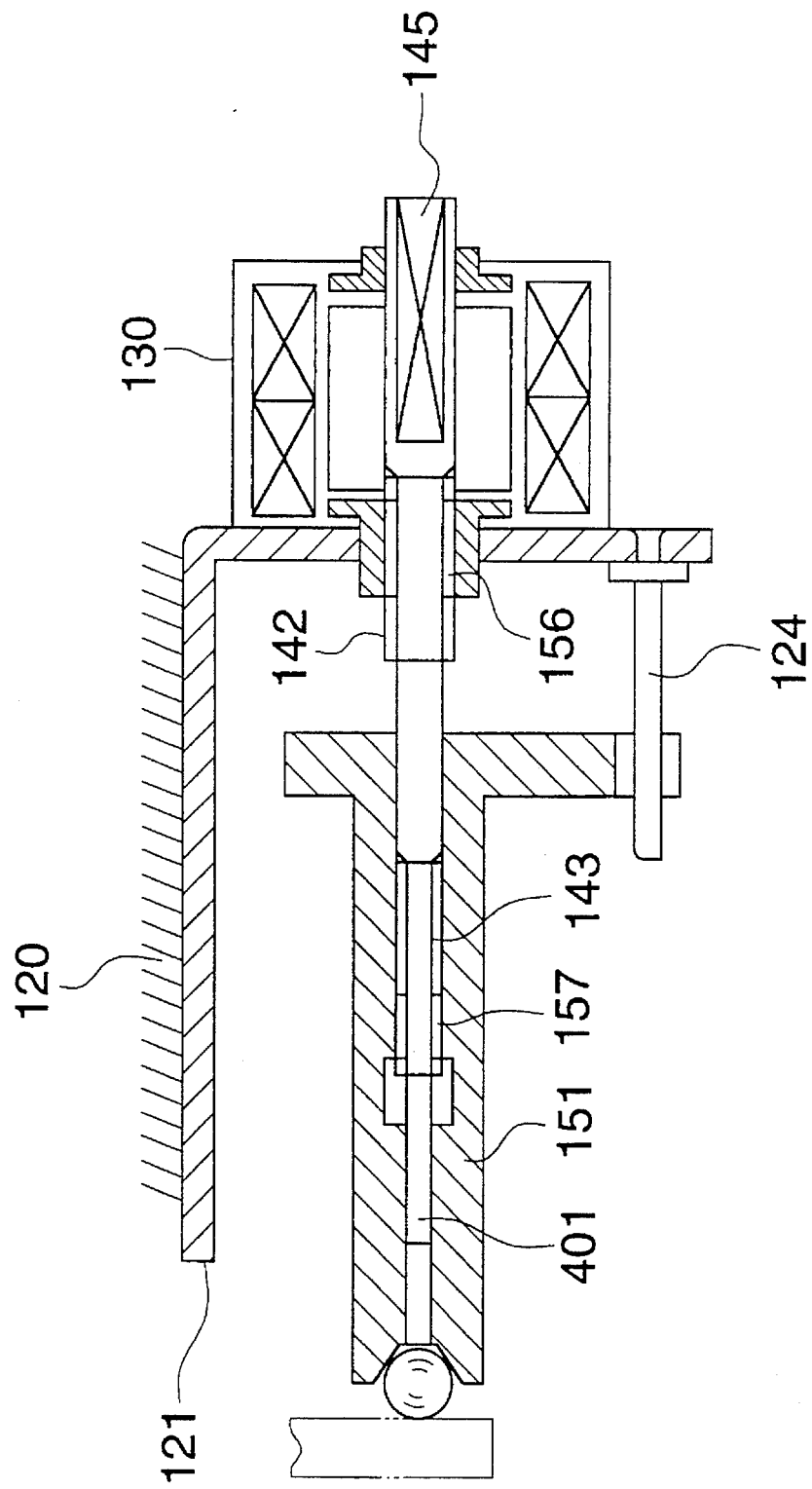
FIG. 12 is a schematic illustration showing the mechanism of linear movement of the example of the present invention.

FIG. 12 is a schematic illustration showing the linear movement mechanism of the example of the present invention. A bottom board 121 is fixed to the main body 120. The bottom board 121 is provided with a pin 124 engaging with the locking portion of a slider member 151, and a motor 130 is attached onto the bottom board 121. A rod member 401 includes: a first male screw portion 142 engaging with a first female screw 156 fixed to the bottom board 121; a second male screw portion 143; and a guide portion. In this connection, the pitch of the second male screw 143 is different from the pitch of the first male screw 142, however, the direction of the pitch of the second male screw 143 is the same as the direction of the pitch of the first male screw 142. Accordingly, the slider member described later is minutely moved in accordance with a difference between the pitch of the first male screw 142 and the pitch of the second male screw 143. The rod member 401 is rotated by a motor 130 and linearly moved by the action of the first female screw 156 fixed to the bottom board 121. In this connection, a rotor of the motor is engaged with a locking member 145 of the rod member 401, and the rotor is capable of sliding while it is rotating. The slider member 151 has the second female screw 157 engaging with the second male screw portion 143 of the rod member, so that the slider member 151 slides linearly. When the slider member 151 slides linearly, a ball arranged at the end of the slider member on the central axis of the rod member pushes an object to be pushed shown by a two-dotted chain line in FIG. 12, so that the object to be pushed is moved. Due to the foregoing motion, the pixel shift mechanism of an electronic still camera is linearly moved by a method which will be described in an image input apparatus later.

Figure 16:
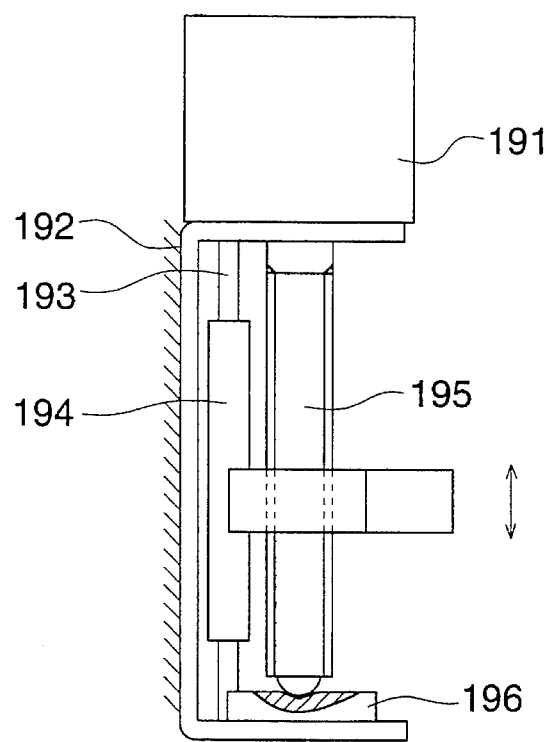
FIG. 16(a) is a schematic illustration showing an arrangement of the mechanism of linear movement of the conventional example.
FIG. 16(b) is a schematic illustration showing an arrangement of the mechanism of linear movement of the conventional example.
Figure 16:
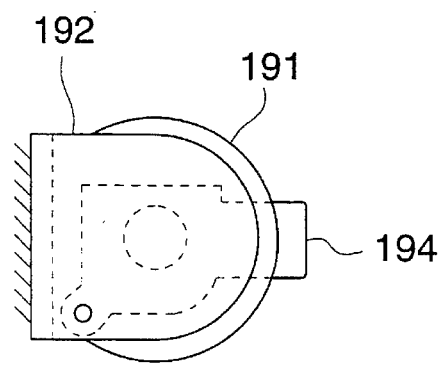

Since the object to be moved is moved on the central axis of the rod member as described above, an excessive force is not given to the rod and slider members, so that the motor can be smoothly rotated. In the device of the prior art illustrated in FIGS. 16(a) and 16(b), it is necessary to make the rod member to be parallel with the parallel shaft. However, unlike the device of the prior art, it is unnecessary to provide parallelism in this example. Accordingly, it is possible to realize a simple and inexpensive linear movement mechanism.

The following is another example showing a linear movement mechanism to which the pixel shift mechanism of an electronic still camera is applied.

Figure 13:
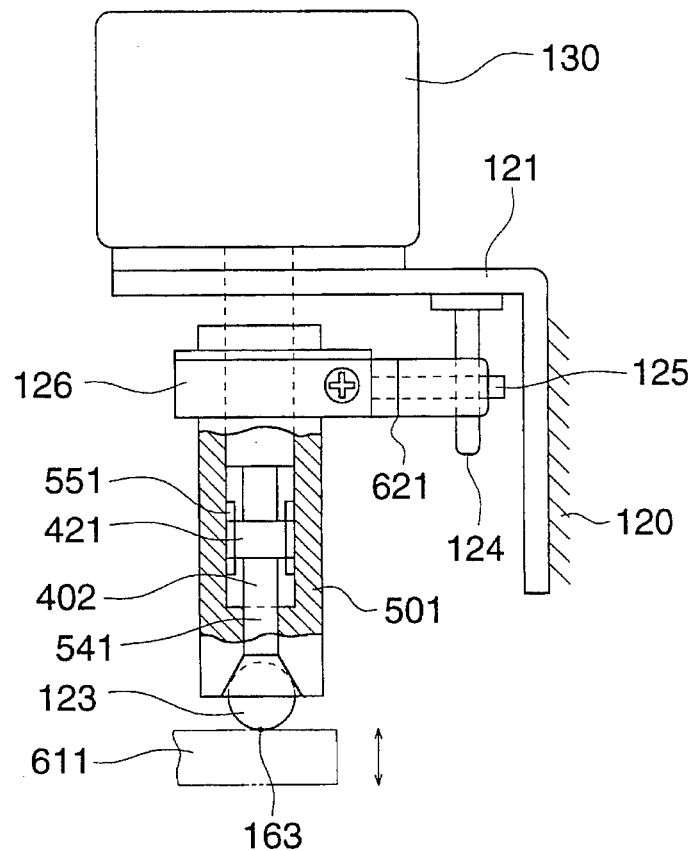
FIG. 13($a$) is a schematic illustration showing the mechanism of linear movement of another example of the present invention.
Figure 13:
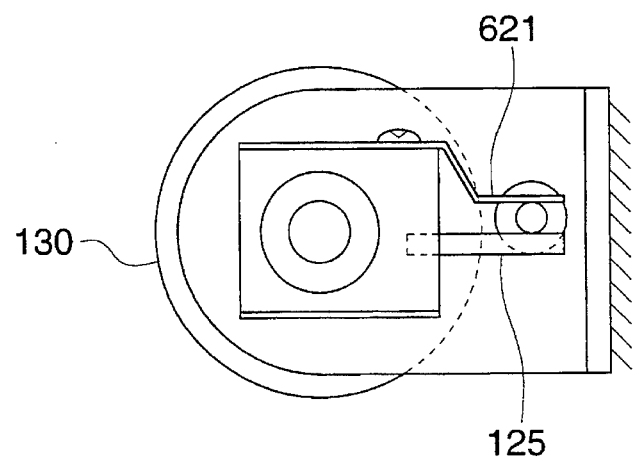

FIGS. 13(a) and 13(b) are schematic illustrations showing another linear movement mechanism of the example of the present invention. FIG. 13(a) is an upper view, and FIG. 13(b) is a side view. Like parts in each of FIGS. 12, 13(a) and 13(b) are identified by the same reference character, and part of explanation will be omitted here.

The bottom board 121 is fixed to the main body 120, and the motor 130 is attached onto the bottom board 121. The rod member 402 includes a male screw portion 412 and a guide portion 541. The rod member 402 is rotated by the motor 130. When the rod member 402 is rotated, the slider member 501 is linearly moved by the action of the female screw portion 551. When the slider member 501 is linearly moved, a ball 123 arranged close to the central axis of the rod member is moved, and an object 611 to be moved is moved being pushed at a point 163 of application. Due to the foregoing motion, the pixel shift mechanism of an electronic still camera is linearly moved by a method which will be described in Example 5 later. In this connection, the rotation of the slider member 501 is stopped by the action of a pin 125 fixed to the flange 126 and a pin 124 held by the pushing member 621.

Figure 14:
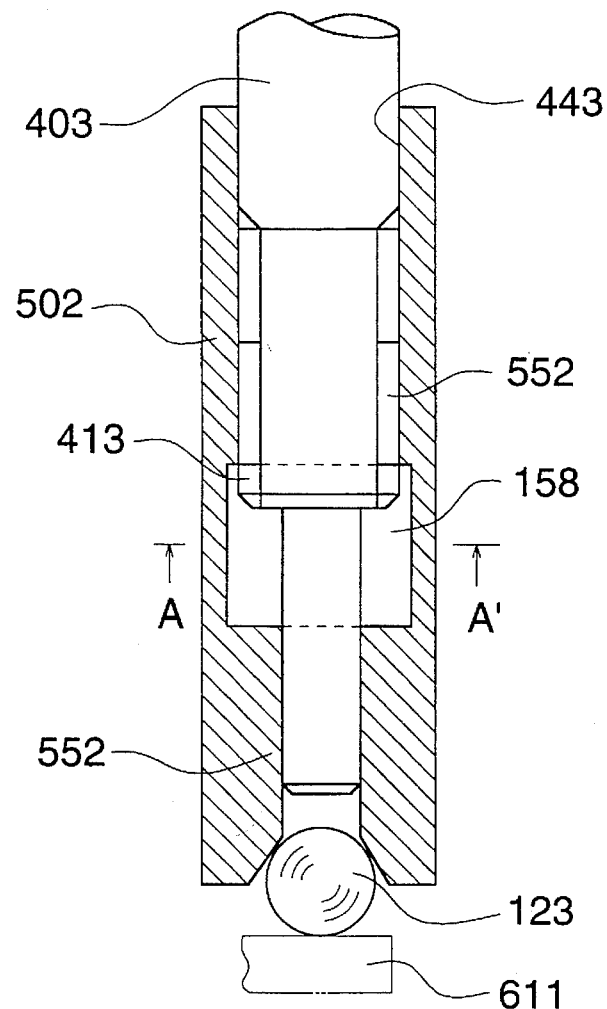
FIG. 14(a) is a schematic illustration showing the primary portion of the mechanism of linear movement of still another example of the present invention.
FIG. 14(b) is a schematic illustration showing the primary portion of the mechanism of linear movement of still another example of the present invention.
Figure 14:
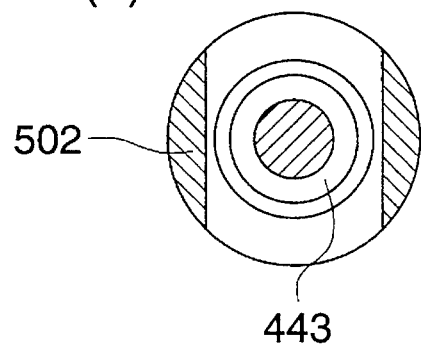

FIGS. 14(a) and 14(b) are schematic illustrations showing the primary portion of the linear movement mechanism of another example of the present invention. FIG. 14(a) is a sectional view of the primary portion, and FIG. 14(b) shows the A—A section of FIG. 14(a). This example is a variation of the mechanism illustrated in FIGS. 13(a) and 13(b). A motor not shown in the drawing rotates the rod member 403 having a male screw portion 413 and a guide portion 443. The slider member 502 includes a female screw portion 552 engaging with the male screw portion, and a guide receiving portion 542 engaging with the guide portion. Therefore, the slider member 502 is linearly moved when the rod member 403 is rotated. In this connection, a locking member for locking the slider member 502 is omitted in the drawing. When the slider member 502 is linearly moved in the above manner, an object 611 to be moved is moved being pushed by a ball 123 provided at the end of the slider member 502. In this connection, a hole 158 is formed in the slider member 502. Due to the hole 158, the female portion can be easily machined, and chips generated in the process of screw cutting can be easily removed. In general, it is difficult to provide a high accuracy in the cutting of a female screw. Therefore, length of the female screw is reduced in this example, so that a change in the accuracy of the engaging length is avoided. In this way, the accuracy is enhanced.

As described above, the ball arranged on the central axis of the rod member moves the object to be moved. Accordingly, an excessively high force is not given to the rod and slider members, so that the motor can be smoothly rotated.

An example is shown below, which is an image input apparatus for use in an electronic still camera to which a solid state imaging device having the pixel shift mechanism is applied.

Figure 15:
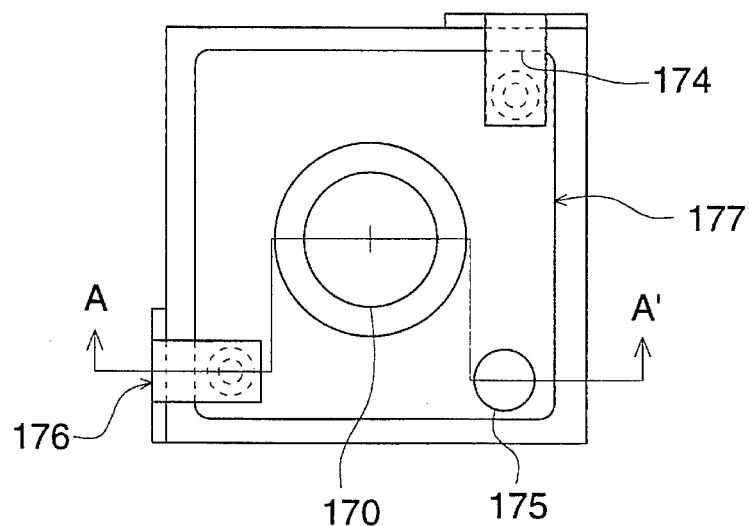
FIG. 15(a) is an arrangement view of the image input apparatus of the present invention.
FIG. 15(b) is an arrangement view of the image input apparatus of the present invention.
Figure 15:
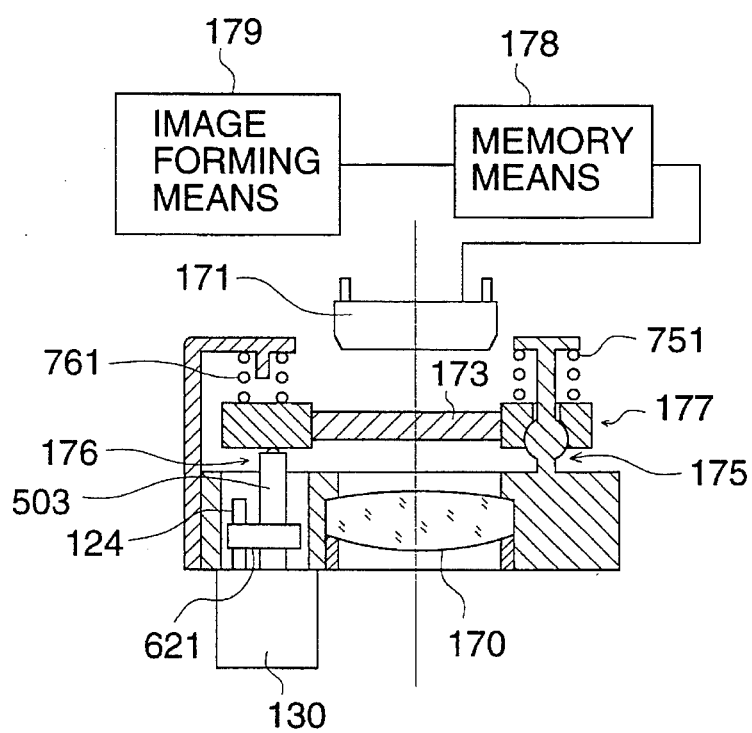

FIGS. 15(a) and 15(b) are arrangement views of the image input apparatus of the present invention. FIG. 15(a) is a plan view of the imaging section of the image input apparatus. FIGS. 15(a) and 15(b) are sectional views taken on line A—A.

The pin 124 is fixed to the main body. The motor 130 is also attached to the main body. When the motor is driven, the rod member including a male screw portion and a guide portion is rotated (shown in FIGS. 13(a) and 13(b)). On the other hand, when the male screw portion of the rod member is rotated, the slider member 503 is linearly moved by the action of a female screw member. Therefore, the tilting means 177 for tilting an object to be moved is moved. In this connection, the slider member includes a pushing member 621, the rotation of which is locked by a pin 124. While the rotation is locked, the slider member is moved. A transparent parallel flat member 173 arranged in approximately parallel with the imaging surface of the imaging device is disposed in the optical path between the picture-taking optical system 170 and the facial imaging device 171. The tilting means 177 tilts the transparent parallel flat member 173 with respect to the facial imaging device, so that an image formed on the imaging device is moved. The tilting means 177 is composed in the following manner:

Three points not aligned on a straight line are selected, and one of the points is determined to be a support portion 175, and the other two points are determined to be action points 174, 176 for operating the transparent parallel flat member 173. In this connection, springs 751, 761 are provided so that the transparent parallel flat member 173 can be pushed. The memory means 178 stores the data of each image moved by the tilting motion of the transparent parallel flat member. The image forming means 179 synthesizes an image of high resolution from the image stored in the memory means.

Since the object to be moved is moved on the central axis of the rod member as described above, an excessively high force is not given to the rod and slider members, and the motor is smoothly rotated.

Since the apparatus of the present invention is composed in the manner described above, the following effects can be provided.

Unlike the conventional apparatus, it is not necessary to provide parallelism between the rod member and the parallel shaft. Therefore, the linear movement mechanism can be made to be simple, inexpensive and accurate.

It is possible to provide a linear movement mechanism in which the male and female screws are appropriately meshed with each other and the slider member can be smoothly moved linearly.

According to the linear movement mechanism of the invention, the slider member can be minutely moved, and the mechanism is simple, inexpensive and accurate.

According to the linear movement mechanism of the invention, the rod member can be smoothly rotated and the slider can be linearly moved even when a low force is applied.

According to the present invention, it is possible to provide an image input apparatus in which pixels are shifted in high accuracy at low cost.

What is claimed is:

1. An image input apparatus comprising:

(a) an optical system having an optical path;

(b) an image reading device having a picture-taking surface, for reading a first image formed onto the picture-taking surface;

(c) a transparent plate member having two flat reflection surfaces which are opposite to and parallel with each other, the plate member being arranged in the optical path of the optical system substantially in parallel with the picture-taking surface of the imaging device so that the image passed through the optical system is transmitted through the transparent plate member;

(d) a tilting means for tilting the plate member with respect to the imaging device so that a second image is formed on the imaging device by moving the first image, the tilting means including, (1) a support portion for supporting the plate member at a point selected from three points on the plate member which are not aligned on a straight line, the support portion comprising a combination of
a spherical protrusion and
a dent slidably engaged with the spherical protrusion, and (2) two operating portions for providing a tilting operation at two other points selected from the three points on the plate member, wherein, when one of the two operating portions is operated, the plate member is tilted around a rotational axis coincident with a straight line connecting the other of the two operating portions with the support portion;

(e) memory means for storing the first and the second images; and (f) image composing means for synthesizing the first and second images stored in the memory means, thereby an image having a high resolution being obtained.

2. The image input apparatus of claim 1, wherein the tilting means further comprises:

a base unit integrally mounted on the imaging device, the base unit being provided with said support portion and said two operating portions; and pushing means for pushing said plate member toward the base unit.

3. The image input apparatus of claim 2, wherein the radius center of the spherical protrusion at said support member is located within the same surface as that of a surface where said plate member is in contact with said one of two operating portions.

4. The image input apparatus of claim 2, wherein when either said plate member or said base unit has a protrusion on a side thereof at said support portion, either said plate member or said base unit has a protrusion on said side thereof at said two operating portions, and wherein when either said plate member or said base unit has a dent on a side thereof at said support portion, either said plate member or said base unit has a flat surface on said side thereof at said two operating portions.

5. The image input apparatus of claim 4, wherein a radius of said protrusion at said support is greater than a radius of said protrusion at said two operating portions.

6. The image input apparatus of claim 4, wherein the following condition is satisfied:

$$r = r1 - h$$

where r1 represents a radius of the protrusion at said support portion, h represents a length between a radius center of said protrusion at support portion and a reference surface of said plate member, and r represents a radius of said protrusion at two operating portions.

7. The image input apparatus of claim 6, wherein said base unit and a lens barrel on which said picture-taking optical system are integrally formed as a unit.

8. The image input apparatus of claim 2, wherein said pushing means comprises a coil compression spring which is interposed between a presser portion formed at an end of a support member and said plate member, and wherein the presser portion and a protrusion at said support portion provided on said base unit are integrally formed as one unit.

9. The image input apparatus of claim 1, wherein a straight line connecting a radius center of the spherical protrusion at said support portion with a radius center of a spherical protrusion at one of said two operating portions with which said plate member is contacted, is made to be parallel with said plate member.

* * * * *